(12) United States Patent
Jagyasi et al.

(10) Patent No.: US 11,170,217 B2
(45) Date of Patent: Nov. 9, 2021

(54) METHOD AND SYSTEM FOR PREDICTION AND MITIGATION OF SPONTANEOUS COMBUSTION IN COAL STOCK PILES

(71) Applicant: Accenture Global Solutions Limited, Dublin (IE)

(72) Inventors: Bhushan Gurmukhdas Jagyasi, Thane West (IN); Abhijeet Chowdhary, Navi Mumbai (IN); Ramaa Gopal Varma Vegesna, Hyderabad (IN); Nasiruddin Mohammad, Hyderabad (IN); Pallavi S. Gawade, Thane West (IN); Urvi Suresh Shah, Thane West (IN); Abhishek Kumar Jaiswal, Mumbai (IN); Akash Manikrao Jadhav, Pune (IN); Bolaka Mukherjee, Howrah (IN)

(73) Assignee: Accenture Global Solutions Limited, Dublin (IE)

( * ) Notice: Subject to any disclaimer, the term of this patent is extended or adjusted under 35 U.S.C. 154(b) by 206 days.

(21) Appl. No.: 16/557,489

(22) Filed: Aug. 30, 2019

(65) Prior Publication Data

US 2021/0064848 A1    Mar. 4, 2021

(51) Int. Cl.
*G06K 9/00* (2006.01)
*G01W 1/06* (2006.01)
(Continued)

(52) U.S. Cl.
CPC ............. *G06K 9/0063* (2013.01); *G01W 1/06* (2013.01); *G06N 3/0418* (2013.01); *G06N 3/08* (2013.01);
(Continued)

(58) Field of Classification Search
CPC ...... G06K 9/0063; G06K 2009/00644; G01W 1/06; G06N 3/0418; G06N 3/08; G08B 25/014
See application file for complete search history.

(56) References Cited

U.S. PATENT DOCUMENTS

| | | | |
|---|---|---|---|
| 2012/0270162 A1* | 10/2012 | Dahlhielm | F23N 1/002 431/12 |
| 2015/0033619 A1* | 2/2015 | Wolff | C10L 9/10 44/620 |

(Continued)

FOREIGN PATENT DOCUMENTS

| | | |
|---|---|---|
| CN | 100476417 C | 8/2009 |
| CN | 203476397 U | 3/2014 |

(Continued)

OTHER PUBLICATIONS

Extended European Search Report dated Nov. 10, 2020 for European Patent Application No. 20186009.5.

(Continued)

*Primary Examiner* — Fayyaz Alam
(74) *Attorney, Agent, or Firm* — Plumsea Law Group, LLC

(57) ABSTRACT

A method for predicting conditions associated with a coal stock pile is described. The method includes collecting aerial data for a site including one or more coal stock piles. Using the aerial data, the method includes performing localization of the site to identify boundaries of the coal stock piles and extracting multi-spectral features. The method also includes obtaining additional data associated with the coal stock piles from at least one data source and merging the aerial data with the additional data. Using the merged data and the extracted multi-spectral features, the method includes analyzing a status of the coal stock piles by a prediction module to predict at least one of an impending combustion event or (Continued)

a severe condition associated with the coal stock piles. In response to the predicted at least one impending combustion event or severe condition, the method includes implementing a response.

20 Claims, 13 Drawing Sheets

(51) Int. Cl.
  *G06N 3/04* (2006.01)
  *G06N 3/08* (2006.01)
  *G08B 25/01* (2006.01)
(52) U.S. Cl.
  CPC . *G08B 25/014* (2013.01); *G06K 2009/00644* (2013.01)

(56) References Cited

U.S. PATENT DOCUMENTS

| | | | | |
|---|---|---|---|---|
| 2018/0021610 | A1* | 1/2018 | Yeum | A62C 3/04 44/629 |
| 2019/0054331 | A1* | 2/2019 | Ozment | A62C 3/0292 |

FOREIGN PATENT DOCUMENTS

| | | |
|---|---|---|
| CN | 204535745 U | 1/2015 |
| CN | 105484795 A | 4/2016 |
| CN | 103961827 B | 8/2016 |
| CN | 106874671 A | 6/2017 |
| CN | 107300533 A | 10/2017 |

OTHER PUBLICATIONS

Claudia Künzer: "Demarcating Coal Fire Risk Areas based on Spectral test Sequences and Partial Unmixing Using Multi Sensor Remote Sensing Data", PhD Thesis, Vienna University of Technology, Jan. 3, 2005, XP055745081, https://publik.tuwien.ac.at/files/PubDat_120590.pdf.

Hui Ren et al.: "Monitoring And Forecast Method of Mine External Fire", International Joint Conference on Computational Sciences And Optimization, 2009, IEEE, Apr. 24, 2009, pp. 889-891, XP031502811.

Haeyang Pak et al., "Evaluation of Spontaneous Combustion in Stockpile of Sub-bituminous Coal", published Feb. 2015; http://www.kobelco.co.jp/english/ktr/pdf/ktr_33/021-027.pdf.

Tanjung Jati B., "Coal Stockpile Management Self Combustion Control"; https://www.jbic.go.jp/ja/business-areas/environment/projects/contents/pdf/48649_17.pdf [retrieved Feb. 25, 2020].

Lia Duarte et al., "Distributed Temperature Measurement in a Self-Burning Coal Waste Pile through a GIS Open", published Mar. 17, 2017; https://www.mdpi.com/2220-9964/6/3/87.

Jian Zhang et al., "A review on numerical solutions to self-heating of coal stockpile: Mechanism, theoretical basis, and variable study", published 2016; https://ro.uow.edu.au/cgi/viewcontent.cgi?article=6715&context=eispapers.

Qi Lin et al., "Analytical prediction of coal spontaneous combustion tendency: Velocity range with high possibility of self-ignition", published 2016.

Hu Wen et al., "Prediction of Spontaneous Combustion Potential of Coal in the Gob Area Using CO Extreme Concentration: A Case Study", published May 2017; https://www.researchgate.net/publication/316753033_Prediction_of_Spontaneous_Combustion_Potential_of_Coal_in_the_Gob_Area_Using_CO_Extreme_Concentration_A_Case_Study.

Hongqing Zhu et al., "The stage analysis and countermeasures of coal spontaneous combustion based on five stages division", published Aug. 23, 2018; https://journals.plos.org/plosone/article/file?id=10.1371/journal.pone.0202724&type=printable.

VIMTA Labs Limited, NTPC Limited, New Delhi, Final Environmental Impact Assessment Report for Telangana Super Thermal Power Project Stage-I (2x800MW) at Ramagundam, Karimnagar District, Telangana State, published Mar. 27, 2015; https://tspcb.cgg.gov.in/publichearings/NTPC%20(Telangana%20STPP%20Stage%20I),%20Karimnagar%20Dist.%20%20EIA%20Report.pdf.

"Incident near Boggabri—Coal fire 'under control'", published Jul. 24, 2015; https://www.northerndailyleader.com.au/story/3232772/incident-near-boggabri-coal-fire-under-control/.

Emil Braun, "Self heating properties of coal", published Aug. 1987; https://nvlpubs.nist.gov/nistpubs/Legacy/IR/nbsir87-3554.pdf.

Humboldt State Geospatial Online, GSP 216 Introduction to Remote Sensing; "Normalized Burn Ratio"; [retrieved Feb. 25, 2020].

* cited by examiner

METHOD AND SYSTEM FOR PREDICTION AND MITIGATION OF SPONTANEOUS COMBUSTION IN COAL STOCK PILES

TECHNICAL FIELD

The present disclosure relates to coal mines and coal stock pile storage safety. More specifically, the present disclosure generally relates to a method and system for prediction and mitigation of spontaneous combustion in coal stock piles.

BACKGROUND

Coal is typically stored by coal mining facilities and other industries, such as thermal power plants, metallurgical industries (e.g., iron and steel plants), etc., for weeks before it is used or transported for further use. Coal mining facilities store coal after production in large volume stock piles for some period of time, depending on market demand. Power plants that use coal for power generation or production purposes also store coal in stock piles until it is needed for power generation. This storage of coal in large quantities poses several challenges.

One such potentially severe problem with storing coal is spontaneous combustion. Spontaneous combustion has long been recognized as a fire hazard in stored coal. Spontaneous combustion fires usually begin as "hot spots" within the coal stock pile. These hot spots are caused when coal undergoes oxidation from absorbing oxygen from the air. Heat generated by the oxidation can then cause a fire to be initiated in the coal.

This issue also affects a facility's coal stockpiling capacity. Facilities with coal stock piles usually have to move coal frequently to different locations due to the possibility of spontaneous combustion. Sometimes, these facilities may experience a shortage of coal at a particular location, as the capacity of stock piles for thermal power plants is approximately 7 to 45 days worth of coal, equaling approximately 50,000 tons to 800,000 tons of coal. After some period of time, stored coal can lose its usability, and, therefore, these facilities experience financial losses. Additionally, combustion of stored coal releases dangerous gasses and carbon monoxide that are toxic to humans and can contribute to global warming.

Earlier technologies to address the issue of spontaneous combustion in coal stock piles have several limitations. For example, in the coal mining industry, coal stock pile locations will typically be changed every few years, as the site of the excavations continually changes. Accordingly, manual monitoring equipment for the coal stock piles also must be moved to the new location. This technique requires a large expenditure of time and manual labor to move and monitor the coal stock piles.

Another conventional technique for mitigation of spontaneous combustion in coal stock piles includes frequent compacting and dressing of the stock piles using dozing or loading machines or using flame retardants that include polymer organic substances or other chemicals that help reduce the temperatures in the coal stock pile. These techniques, however, can cause degradation of the quality of the coal and results in unproductive utilization of the dozing and loading machines, as well as the associated labor.

There is a need in the art for a system and method that addresses the shortcomings of the prior art discussed above.

SUMMARY

A system and method for prediction and mitigation of spontaneous combustion in coal stock piles is provided herein. The example embodiments provide automated monitoring and mitigation for impending combustion events or other severe conditions associated with coal stock piles. The system and method may include (1) collecting aerial data for a site including one or more stock piles; (2) extracting multi-spectral features for the one or more coal stock piles, (3) obtaining additional data associated with the one or more coal stock piles from at least one data source, (4) merging the collected aerial data with the obtained additional data, and (5) using the merged data and extracted multi-spectral features, analyzing a status of the one or more coal stock piles, by a prediction module implementing a machine-learning algorithm, to predict at least one of an impending combustion event or a severe condition associated with the one or more coal stock piles. By following these steps, more accurate predictions can be made in a shorter time than relying on humans to manually observe and analyze coal stock piles. In particular, the speed and quality of predictions can be enhanced by using artificial intelligence (AI) and/or machine-learning powered models to analyze a status of the one or more coal stock piles to predict at least one of an impending combustion event or a severe condition associated with the one or more coal stock piles.

In one aspect, a method for predicting conditions associated with a coal stock pile is provided, the method comprising: collecting aerial data for a site including one or more coal stock piles; using the aerial data, performing localization of the site to identify boundaries of the one or more coal stock piles; extracting multi-spectral features for the one or more coal stock piles; obtaining additional data associated with the one or more coal stock piles from at least one data source; merging the collected aerial data with the obtained additional data for the one or more coal stock piles; using the merged data and the extracted multi-spectral features, analyzing a status of the one or more coal stock piles, by a prediction module implementing a machine-learning algorithm, to predict at least one of an impending combustion event or a severe condition associated with the one or more coal stock piles; and in response to the predicted at least one impending combustion event or severe condition, implementing a response.

In another aspect, one or more non-transitory computer readable storage media encoded with instructions are provided that, when executed by a processor of a coal stock pile analysis system, causes the processor to: collect aerial data for a site including one or more coal stock piles; using the aerial data, perform localization of the site to identify boundaries of the one or more coal stock piles; extract multi-spectral features for the one or more coal stock piles; obtain additional data associated with the one or more coal stock piles from at least one data source; merge the collected aerial data with the obtained additional data for the one or more coal stock piles; using the merged data and the extracted multi-spectral features, analyze a status of the one or more coal stock piles, by a prediction module implementing a machine-learning algorithm, to predict at least one of an impending combustion event or a severe condition associated with the one or more coal stock piles; and in response to the predicted at least one impending combustion event or severe condition, implement a response.

In another aspect, a coal stock pile analysis system for predicting conditions associated with a coal stock pile is provided, the coal stock pile analysis system comprising: at least one communication interface; a memory; and a processor in communication with the at least one communication interface and the memory, wherein the processor is configured to: collect aerial data for a site including one or more coal stock piles; using the aerial data, perform localization of the site to identify boundaries of the one or more coal stock piles; extract multi-spectral features for the one or more coal stock piles; obtain additional data associated with the one or more coal stock piles from at least one data source; merge the collected aerial data with the obtained additional data for the one or more coal stock piles; using the merged data and the extracted multi-spectral features, analyze a status of the one or more coal stock piles, by a prediction module implementing a machine-learning algorithm, to predict at least one of an impending combustion event or a severe condition associated with the one or more coal stock piles; and in response to the predicted at least one impending combustion event or severe condition, implement a response.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

According to the techniques described herein, a system and method for prediction and mitigation of spontaneous combustion in coal stock piles is provided. The example embodiments provide automated monitoring and mitigation for combustion events or other severe conditions associated with coal stock piles.

As will be described in detail below, the system and method according to the present embodiments provides advanced forecasting and prediction of spontaneous combustion of coal stock piles using remote sensing and on-site sensors. Artificial-intelligence (AI) based predictive models are trained using historical data, including data associated with previous instances of combustion events collected from various locations. As a result, the techniques of the example embodiments provide a proactive solution, rather than merely being reactive, and can provide a localized solution that is specific to each coal stock pile. Additionally, the prediction models described herein may be continuously improved and fine-tuned based on training data and other information obtained from other site locations around the world.

Figure 1:
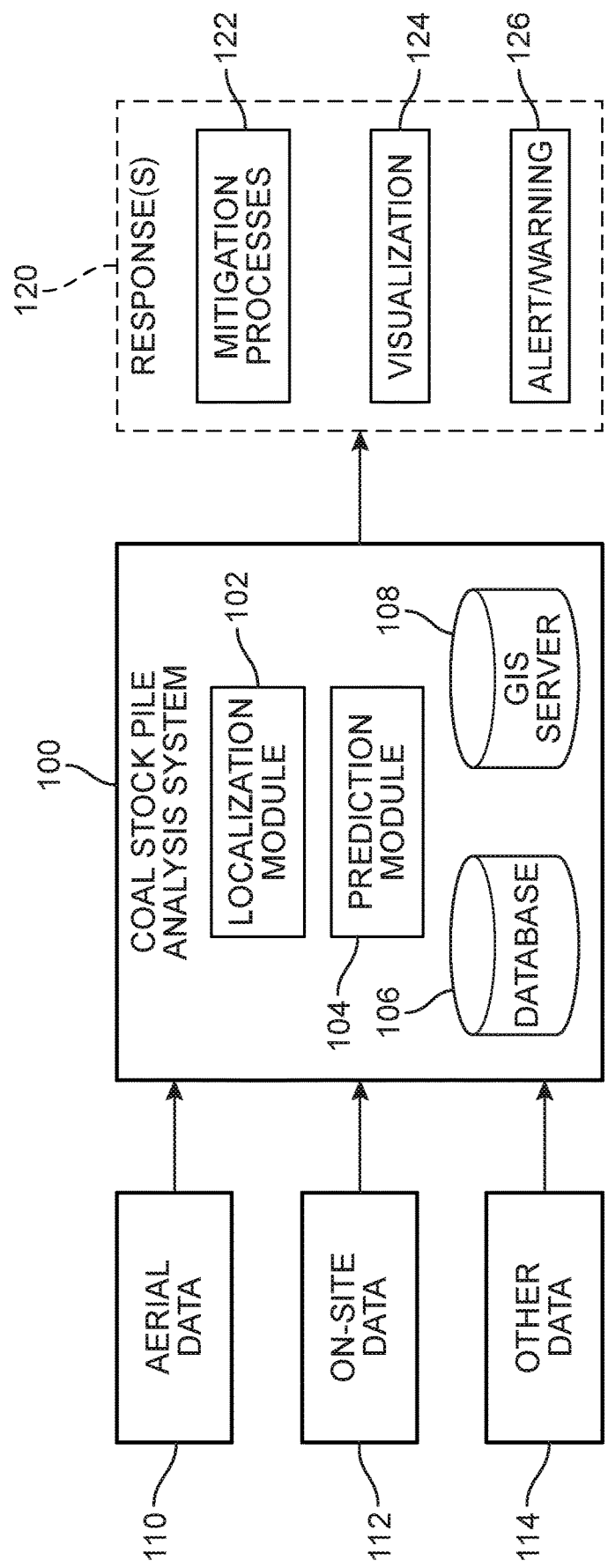
FIG. 1 is a schematic view of an example embodiment of a coal stock pile analysis system.

Referring now to FIG. 1, an example embodiment of a coal stock pile analysis system 100 is illustrated. In example embodiments, coal stock pile analysis system 100 may be used to monitor and predict impending combustion events or severe conditions associated with coal stock piles at various sites. For example, as described above, coal stock piles may be present at coal mining facilities and other industrial facilities, such as thermal power plants, iron and steel plants, and others. As will be described in more detail below, coal stock pile analysis system 100 uses artificial intelligence (AI) and/or machine-learning powered models, including a localization module 102 and a prediction module 104, to process and analyze a plurality of data associated with one or more coal stock piles from different sources to predict impending combustion events or severe conditions associated with the coal stock piles at a site.

Coal stock pile analysis system 100 also includes a database 106 that is configured to store information associated with the coal stock piles at various sites, including previously obtained data associated with a coal stock pile at a site, historical data, trained models, weather data, coal properties and characteristics, information about various responses available at sites, and other information relevant to coal stock pile analysis system 100. In some embodiments, coal stock pile analysis system 100 may also include, or be in communication with, a geographic information system (GIS) server 108 that provides spatial and/or attribute data associated with various geographic areas to coal stock pile analysis system 100. As will be described in more detail below, coal stock pile analysis system 100 may access GIS server 108 to obtain information associated with a geographical area that includes a site having one or more coal stock piles, which may be used by localization module 102 of coal stock pile analysis system 100, for example, to assist with identifying the boundaries of the coal stock piles at the site.

As shown in this embodiment, coal stock pile analysis system 100 is configured to collect or obtain data from a plurality of data sources, including, for example, aerial data 110, on-site data 112, and/or other data 114 from other data sources. These sources may provide data in real time. Aerial data 110 may include data obtained from satellites, unmanned aerial vehicles (UAVs) or drones, cameras, or other remote sensing data sources that can provide aerial data of a site and one or more coal stock piles. On-site data 112 may include various local sensors or data sources that are in close physical proximity to the site and/or the one or more coal stock piles. For example, on-site data 112 may be obtained from temperature sensors, thermal sensors, humidity sensors, moisture sensors, rainfall sensors, gas sensors (e.g., for detecting oxygen and/or carbon monoxide), air quality sensors, or other sensors that measure parameters associated with conditions of the coal stock piles.

Additionally, other data 114 obtained from other data sources may include one or more of weather data obtained from weather satellites or databases, static properties associated with the materials in stock piles (e.g., coal in the coal stock piles), such as gross calorific value, volatility, carbon content, porosity, density, thermal conductivity, specific surface area, presence of particular gasses, etc., obtained from tests performed on the coal, as well as other information used by coal stock pile analysis system 100 to analyze and predict the status of the coal stock piles.

According to the techniques described herein, the resulting prediction from coal stock pile analysis system 100 may be used to initiate one or more responses 120. In some embodiments, responses 120 may assist with mitigating impending combustion events or severe conditions associated with the coal stock piles at a site. For example, responses 120 may include mitigation processes 122 which are used to reduce the likelihood of an impending combustion event or to reduce or control severe conditions associated with the coal stock pile, such as rising temperatures or harmful gasses. In some embodiments, mitigation processes 122 may include initiating a sprinkler system to douse the coal stock piles or initiating automatic dozing of the coal stock piles to compact and/or dress the stock pile. Mitigation processes 122 may also include additional actions intended to mitigate the risk of an impending combustion event or severe condition.

Other types of responses 120 may include a visualization 124 of the coal stock piles at the site, for example, provided on a monitor or display associated with coal stock pile analysis system 100 and/or at the site. Visualization 124 may include indicia or other graphical markers that indicate the conditions of the coal stock piles at the site, including the status of each coal pile. For example, visualization 124 may include a color-coded status overlay that shows each coal stock pile in a different color corresponding to the current status or danger-level associated with the stock pile (i.e., a coal stock pile within acceptable limits may be shown in green, a coal stock pile with moderate risk of an impending combustion event or severe condition may be shown in yellow, and a coal stock pile with high risk or that is currently undergoing a combustion event or severe condition may be shown in red).

In some embodiments, responses 120 may also include an alert or warning 126. Alert or warning 126 may be provided to workers at the site or near the affected coal stock piles about an impending combustion event or severe condition so that they may keep a safe distance away from potentially dangerous areas. Additionally, it should be understood that more than one response of responses 120 may be taken in combination. For example, one or more of mitigation processes 122, visualization 124, and alert or warning 126 may be initiated in combination in response to a prediction of an impending combustion event or severe condition by coal stock pile analysis system 100. It should also be understood that responses 120 may include additional responses to the prediction by coal stock pile analysis system 100.

Figure 2:
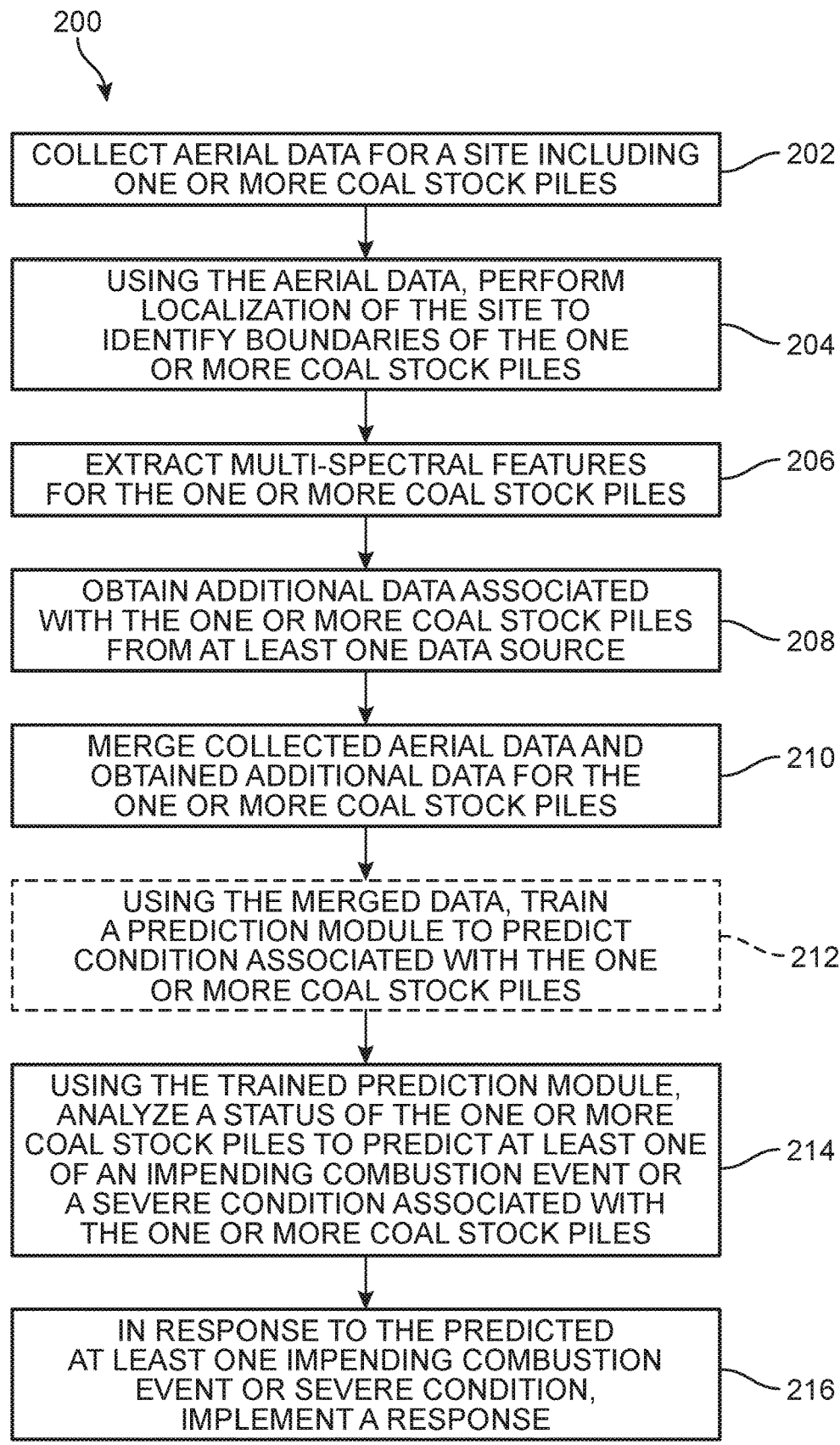
FIG. 2 is a flowchart of an example embodiment of a method for prediction and mitigation of combustion of coal stock piles.

Referring now to FIG. 2, a flowchart of an example embodiment of a method 200 for prediction and mitigation of combustion of coal stock piles is illustrated. In some embodiments, method 200 may be implemented by a coal stock pile analysis system. In an example embodiment, method 200 is implemented by coal stock pile analysis system 100 for a particular site that includes one or more coal stock piles located at the site. It should be understood that method 200 may be repeated for additional sites located at different locations.

In this embodiment, method 200 may begin at an operation 202. At operation 202, aerial data for a site including one or more coal stock piles is collected. For example, coal stock pile analysis system 100 may obtain or collect aerial data 110, as shown in FIG. 1, for a site with coal stock piles that are to be analyzed to predict impending combustion events or severe conditions associated with the coal stock piles at that site. Next, method 200 includes an operation 204. At operation 204, the aerial data from operation 202 is used to perform localization of the site to identify boundaries of the one or more coal stock piles. For example, in some embodiments, a site may include multiple locations where coal is being stored in coal stock piles. Coal stock pile analysis system 100 may use aerial data 110 to perform localization using localization module 102 to identify the boundaries of those coal stock piles at the site. In an example embodiment, the boundaries of each coal stock pile may include geospatial coordinates associated with the coal stock pile location at the site. Further details of the localization process of operation 204 will be described in detail below in reference to FIG. 6.

Method 200 further includes an operation 206 where multi-spectral features for the one or more coal stock piles are extracted. For example, at operation 206, the multi-spectral features for the coal stock piles may be obtained from aerial data 110, such as from satellites or UAVs, and/or from GIS server 108, using the boundaries and/or coordinates of each coal stock pile identified at operation 204. Multi-spectral features include data obtained within a plurality of specific wavelength ranges across the electromagnetic spectrum, including wavelengths outside of the limits of normal human eyesight, such as infrared, ultraviolet, microwave, etc. In different embodiments, multi-spectral features may include between three to fifteen bands of data each associated with different wavelengths. In an example embodiment, the multi-spectral features extracted at operation 206 may include between eight to ten bands or channels of data that are each associated with different wavelengths for the images of the coal stock piles extracted at operation 206.

Next, at an operation 208, method 200 includes obtaining additional data associated with the one or more coal stock piles from at least one data source. For example, at operation 208, the additional data associated with the coal stock piles may include on-site data 112 (e.g., obtained from local sensors in proximity to the coal stock piles, as described above) and/or other data 114, such as weather data or characteristics and properties associated with the coal obtained from testing or mathematical calculations.

At an operation 210, method 200 includes merging the collected aerial data (e.g., from operation 202) with the obtained additional data (e.g., from operation 208) for the one or more coal stock piles at the site. Method 200 may include an operation 212 where the merged data from operation 210 is used to train a prediction module to predict conditions associated with the one or more coal stock piles. For example, the merged data from operation 210 may be used by coal stock pile analysis system 100 to train prediction module 102, as shown in FIG. 1. Further details of the process of using the merged data to train the prediction module will be described below in reference to FIG. 3.

Once the prediction module has been trained at operation 212, method 200 includes an operation 214. In some embodiments, a prediction module for the site and/or the coal stock piles may already exist, for example, stored in database 106 of coal stock pile analysis system 100 from a previous analysis. In these embodiments, method 200 may not need to implement training of the prediction module at operation 212. Instead, the existing prediction module may be used at operation 214.

At operation 214, the trained prediction module is used to analyze a status of the one or more coal stock piles to predict at least one of an impending combustion event or a severe condition associated with the one or more coal stock piles. For example, an impending combustion event may be a determination that, based on the data associated with the coal stock pile, combustion of the coal has begun or temperatures and/or other parameters associated with the coal indicate that combustion is imminent or likely within a certain time period. Severe conditions may include rising temperatures (i.e., not sufficient to initiate combustion but over a threshold temperature), release of dangerous gasses from the coal stock pile, or other potentially dangerous or harmful situations. A more detailed description of using the trained prediction module at operation 214 to make a prediction will be described below in reference to FIG. 10.

In response to the predicted at least one impending combustion event or severe condition, method 200 includes an operation 216, where a response is implemented. For example, as described above, the resulting prediction from coal stock pile analysis system 100 may be used to initiate one or more responses 120, including, but not limited to mitigation processes 122, visualizations 124, and/or alerts or warnings 126. In addition, the responses initiated at operation 216 in response to the predicted impending combustion event or severe condition may include other types of responses to reduce the likelihood of the combustion event or severe condition or to contain or limit the potential danger caused by the impending combustion event or severe condition. In some cases, the type of response initiated at operation 216 may be determined based on information associated with the particular site where the impending combustion event or severe condition will occur. In these cases, coal stock pile analysis system 100 may access site-specific information, for example, in database 106, to implement a response.

It should be understood that method 200 may include additional or optional operations or steps not specifically described. Method 200 may also be performed concurrently for multiple sites and/or multiple coal stock piles. For example, coal stock pile analysis system 100 may implement method 200 for a plurality of different sites having coal stock piles. Additionally, method 200 may be implemented on-demand, in real-time, and/or at some periodic interval to monitor and/or mitigate combustion events or severe conditions at one or more sites with one or more coal stock piles.

Figure 3:
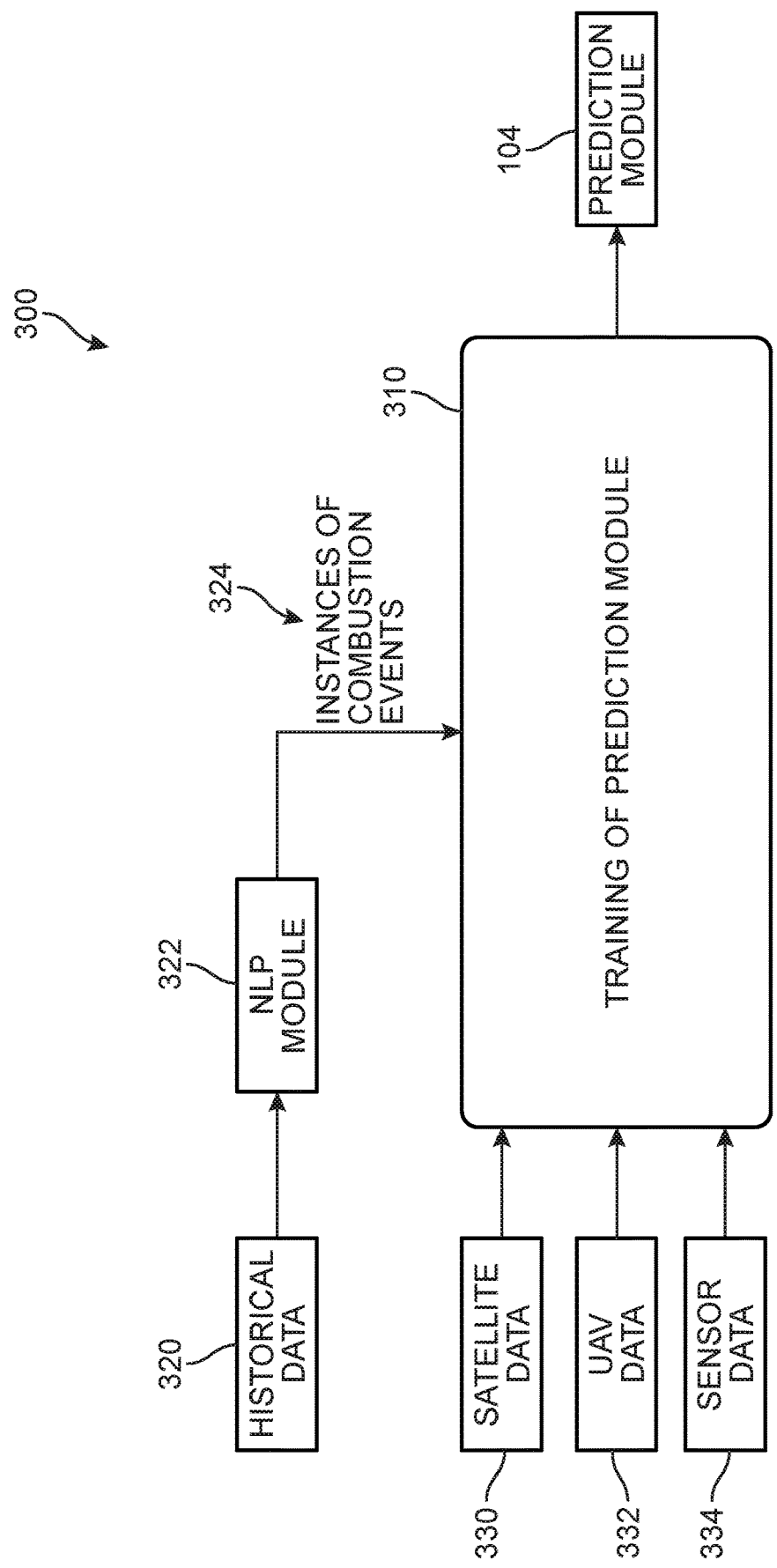
FIG. 3 is a schematic view of an example embodiment of a process for training a prediction module of a coal stock pile analysis system.

Referring now to FIG. 3, an example embodiment of a process 300 for training prediction module 104 of coal stock pile analysis system 100. In this embodiment, process 300 is implemented by coal stock pile analysis system 100 to train prediction module 104 to analyze a status of the one or more coal stock piles to predict at least one of an impending combustion event or a severe condition associated with the one or more coal stock piles. For example, process 300 may be used to train prediction module 104 as part of operation 212 of method 200, described above.

In an example embodiment, process 300 includes an AI or machine-learning based training step 310 for training prediction module 104 using data from various sources so that prediction module 104 may learn or associate the data with the conditions or parameters associated with coal stock piles that lead to impending combustion events or severe conditions. In this embodiment, the data used to train prediction module 104 includes historical data 320. Historical data 320 includes information associated with previous combustion events associated with one or more sites that include a coal stock pile. For example, a natural language processing (NLP) module 322 may be used to scan or analyze news reports and articles to recognize information associated with previous instances of combustion events 324, which are provided for training 310 of prediction module 104. Further details regarding using historical data 320 as part of training 310 of prediction module 104 will be described below with reference to FIG. 5.

In some embodiments, training 310 of prediction module 104 may further include data from other sources, including, but not limited to: satellite data 330, UAV data 332, and/or sensor data 334, such as on-site or local sensors, as described above. Using any one or more data sources 320, 330, 332, 334, training 310 of prediction module 104 is implemented using a machine-learning algorithm, for example, a U-Net convolutional neural network or other deep learning model, to train prediction module 104 to analyze a status of a coal stock pile to predict impending combustion events or severe conditions.

In some embodiments, the data sources used to train prediction module 104 may be based on the information or data that is available or obtainable for a particular site or coal stock pile, as will be described below in reference to FIG. 4. Additionally, the data sources used to train prediction module 104 can also be varied according to different plans or options that are specific to a particular site and/or service levels associated with a site. For example, coal stock pile analysis system 100 may train prediction module 104 according to process 300 using only one data source (e.g., sensor data 334) under a basic model. Further service levels may include training prediction module 104 according to process 300 using multiple data sources (e.g., one of satellite data 330 or UAV data 332 and sensor data 334) under a standard model and using all available data sources (e.g., satellite data 330, UAV data 332, sensor data 334, and/or historical data 320) under a premium model. Accordingly, the greater amount and/or diversity of the data provided as part of training 310 of prediction module 104 may improve or increase the accuracy of predictions made by prediction module 104. With this arrangement, the selection of data used to train prediction module 104 according to process 300 may be varied from site to site.

Figure 4:
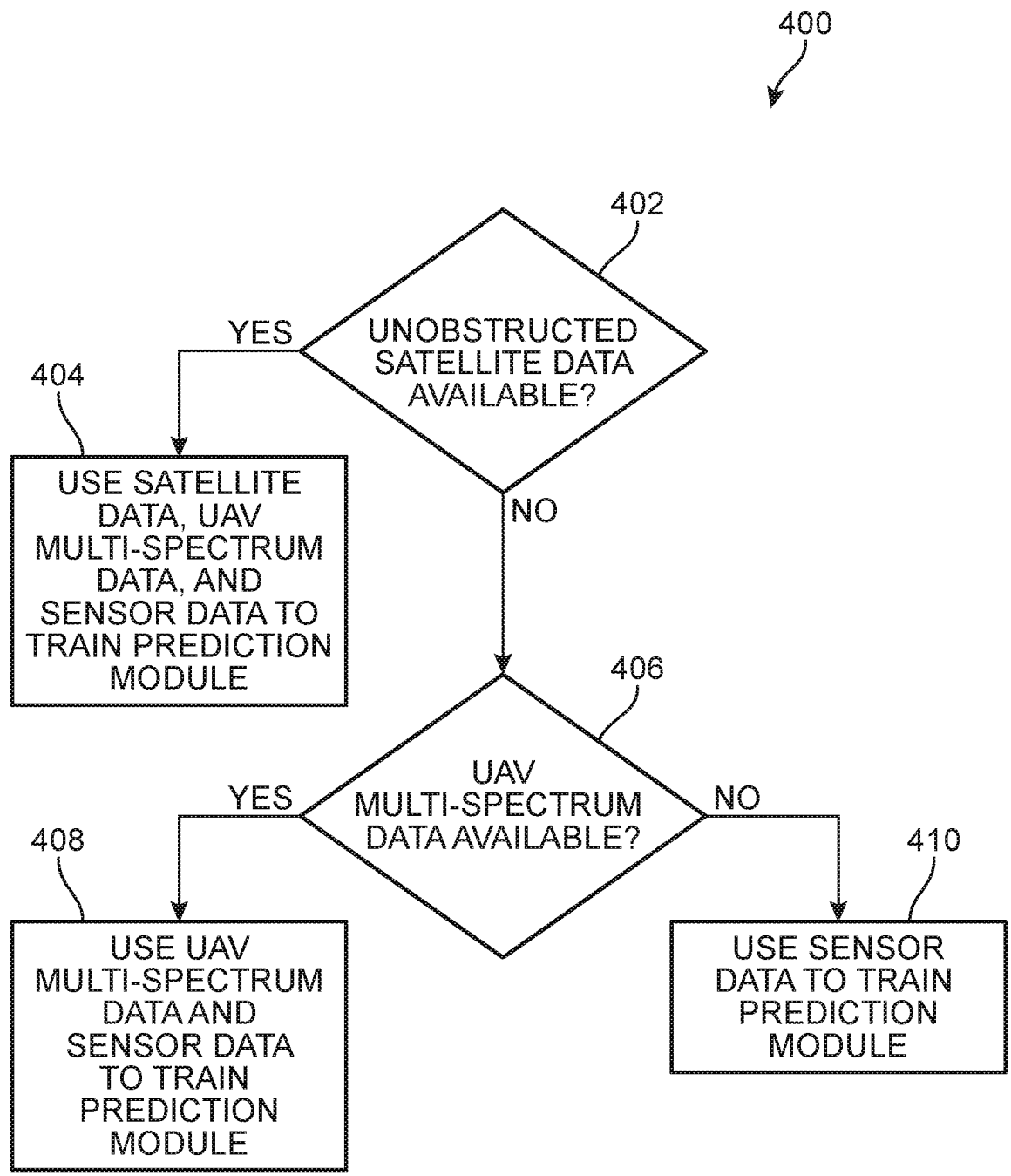
FIG. 4 is a flowchart of an example embodiment of a method for determining available data sources for training a prediction module of a coal stock pile analysis system.

Referring now to FIG. 4, a flowchart of an example embodiment of a method 400 for determining available data sources for training prediction module 104 of coal stock pile analysis system 100 is shown. For example, method 400 may be used for determining which data sources may be provide data for training 310 of prediction module 104 as part of process 300, described above. In this embodiment, method 400 includes an operation 402 where it is determined whether or not unobstructed satellite data for a given site or coal stock pile is available. For example, not all sites or coal stock piles may be in locations where satellite data is available or obtainable.

Upon determining at operation 402 that unobstructed satellite data is available, then method 400 proceeds to an operation 404 where satellite data 330 is used along with additional data, such as multi-spectrum UAV data 332, sensor data 334, and/or historical data 320, to train the prediction module. Upon determining at operation 402, however, that unobstructed satellite data is not available, then method 400 proceeds to an operation 406. At operation 406, it is determined whether or not UAV multi-spectrum data (e.g., UAV data 332) for the given site or coal stock pile is available.

Upon determining at operation 406 that UAV multi-spectrum data is available, then method 400 proceeds to an operation 408 where multi-spectrum UAV data 332 is used along with additional data, such as sensor data 334, and/or historical data 320, to train the prediction module. Upon determining at operation 406, however, that UAV multi-spectrum data is not available, then method 400 proceeds to an operation 410. At operation 410, the prediction module is trained using the available sensor data 334 associated with the given site or coal stock pile.

Figure 5:
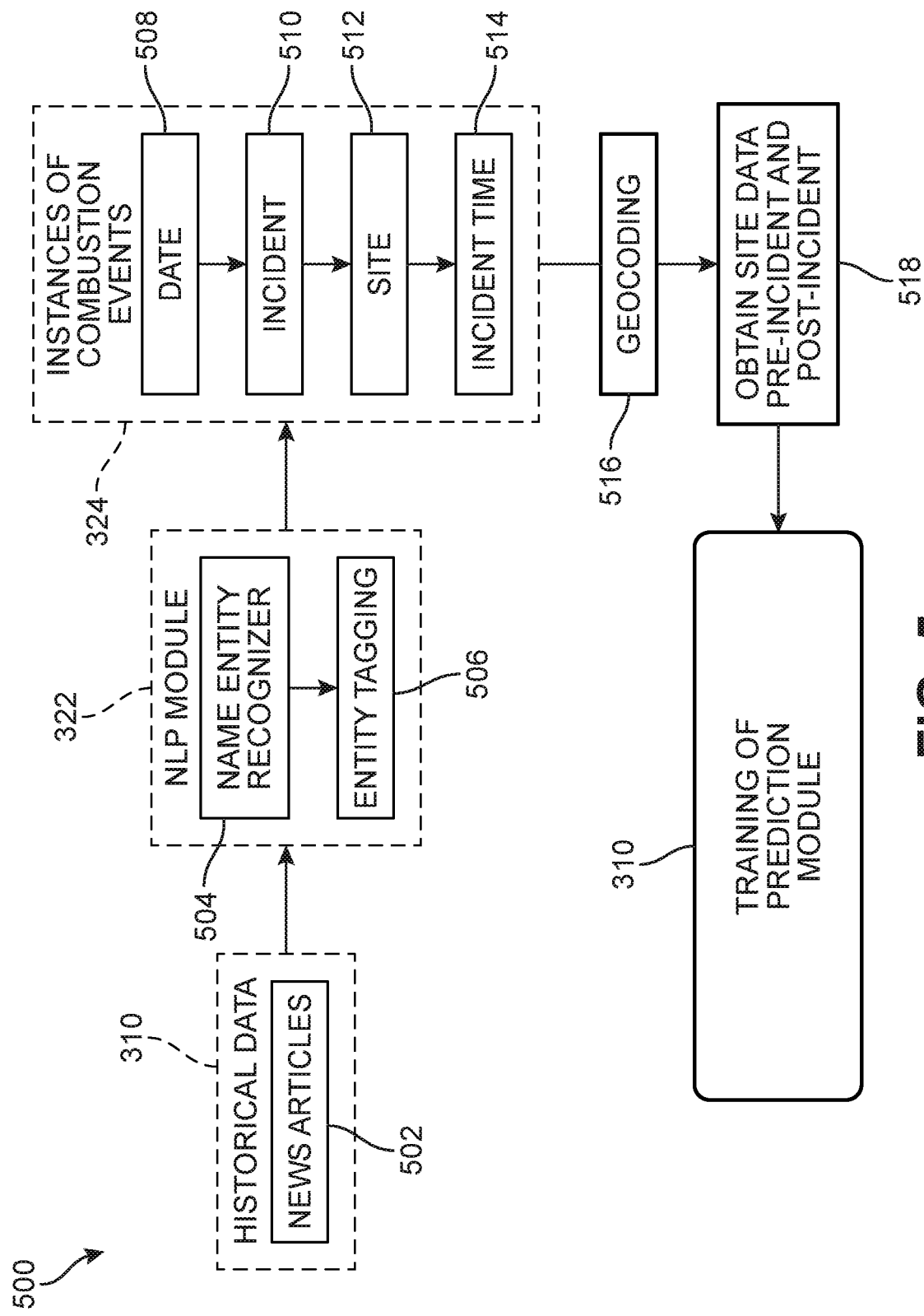
FIG. 5 is a schematic view of an example embodiment of a process for training a prediction module of a coal stock pile analysis system using historical incident data.

FIG. 5 illustrates an example embodiment of a process 500 for training prediction module 104 of coal stock pile analysis system 100 using historical incident data. In this embodiment, further details of using historical data associated with previous incidents of combustion events or severe conditions (e.g., historical data 320) are shown.

For example, in one embodiment, historical data 320 includes news reports or articles 502 that mention combustion events and other severe conditions associated with coal stock piles, such as mine fires, gas releases, etc. In an example embodiment, natural language processing (NLP) module 322 may be used to scan or analyze news reports and articles 502 to recognize key phrases, terms, words, or names, such as entity names, mine locations, etc., that are associated with the coal industry or industries that use or store coal. NLP module 322 may include a name entity recognizer 504 that is configured to identify specific key phrases, terms, words, or names associated with a given site or coal stock pile. Upon detection or identification of these phrases, terms, words, or names, NLP module 322 and/or name entity recognizer 504, may perform entity tagging 506 to tag or flag matches associated with instances of combustion events 324.

Once instances of combustion events 324 have been identified and tagged, further information associated with these events may be obtained. For example, some of the information associated with previous instances of combustion events 324 may include a date 508 of the event or condition, incident details 510 about the type or severity of the event or condition, site details 512, such as a name or location, and an incident time 514, including a duration of the event or condition. The information associated with these previous instances of combustion events 324 may also be geo-coded 516 to associate coordinates with the site and location of the event or condition.

In some embodiments, historical data 320 may include at least satellite data or weather data for at least one site associated with a previous instance of combustion events 324. Using the geo-coded coordinates 516, the satellite data or weather data for the at least one site associated with the previous instance of a combustion event may be obtained for a specific time window 518 that includes a time period prior to the previous combustion event (i.e., pre-incident) and a time period after the previous combustion event (i.e., post-incident). With this arrangement, historical data 320 associated with previous instances of combustion events 324 may be detected and the relevant information provided for training 310 of prediction module 104.

Figure 6:
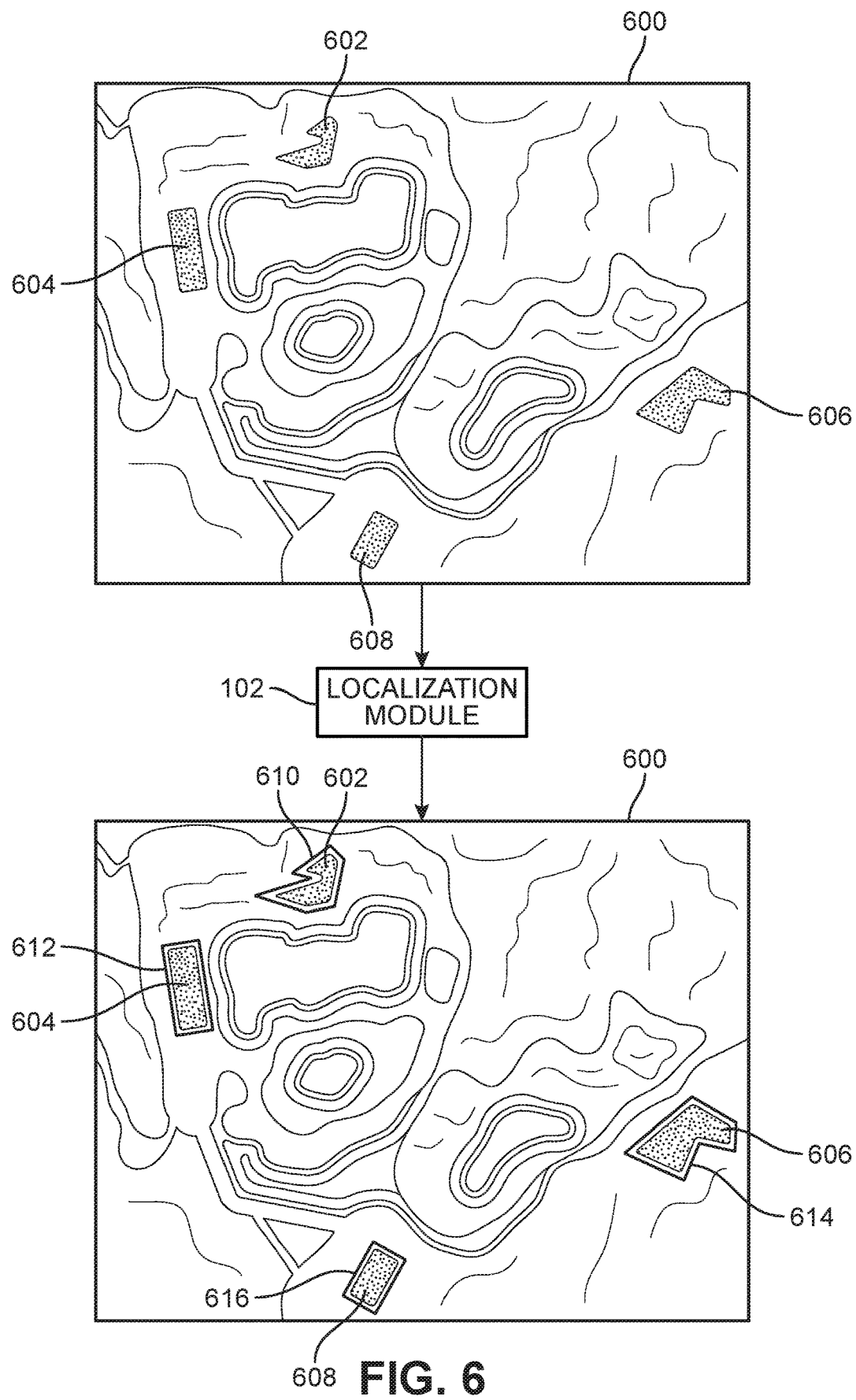
FIG. 6 is a representative view of an example embodiment of a process for using a localization module of a coal stock pile analysis system to identify coal stock piles from aerial data.

Referring now to FIG. 6, an example embodiment of a process for using localization module 102 of coal stock pile analysis system 100 to identify coal stock piles from aerial data is shown. In an example embodiment, the process shown in FIG. 6 may be implemented as part of operation 204 of method 200, described above. In this embodiment, localization module 102 of coal stock pile analysis system 100 may receive aerial data 110, including satellite data, UAV data, or other overhead data, associated with a site 600, such as a coal mining facility or other facility that stores coal. For example, in one embodiment, the aerial data may include one or more satellite images (e.g., raster images) obtained from aerial data 110 and/or GIS server 108 associated with coordinates of site 600 over one or more dates.

As shown in FIG. 6, site 600 is a facility that includes a plurality of coal stock piles, including a first coal stock pile 602, a second coal stock pile 604, a third coal stock pile 606, and a fourth coal stock pile 608. In this embodiment, each coal stock pile 602, 604, 606, 608 is located in different areas of site 600. That is each coal stock pile 602, 604, 606, 608 is physically separated from the other stock piles at site 600. Accordingly, localization module 102 is configured to process the images of site 600 from the obtained aerial data to identify the boundaries of each coal stock pile 602, 604, 606, 608 at site 600.

Upon processing of the aerial data associated with site 600 by localization module 102, boundaries of each coal stock pile 602, 604, 606, 608 at site 600 are identified. For example, as shown in FIG. 6, a first boundary 610 associated with the dimensions of first coal stock pile 602 is identified, a second boundary 612 associated with the dimensions of second coal stock pile 604 is identified, a third boundary 614 associated with the dimensions of third coal stock pile 606 is identified, and a fourth boundary 616 associated with the dimensions of fourth coal stock pile 608 is identified. In some embodiments, each boundary 610, 612, 614, 616 may be expressed or identified using geo-spatial coordinates corresponding to each boundary dimensions at site 600. With this arrangement, localization module 102 allows coal stock pile analysis system 100 to focus analysis of the data associated with site 600 to the identified boundaries (e.g., first boundary 610, second boundary 612, third boundary 614, and fourth boundary 616) of the coal stock piles (e.g., first coal stock pile 602, second coal stock pile 604, third coal stock pile 606, and fourth coal stock pile 608) rather than the entire extent of the area of site 600.

Figure 7:
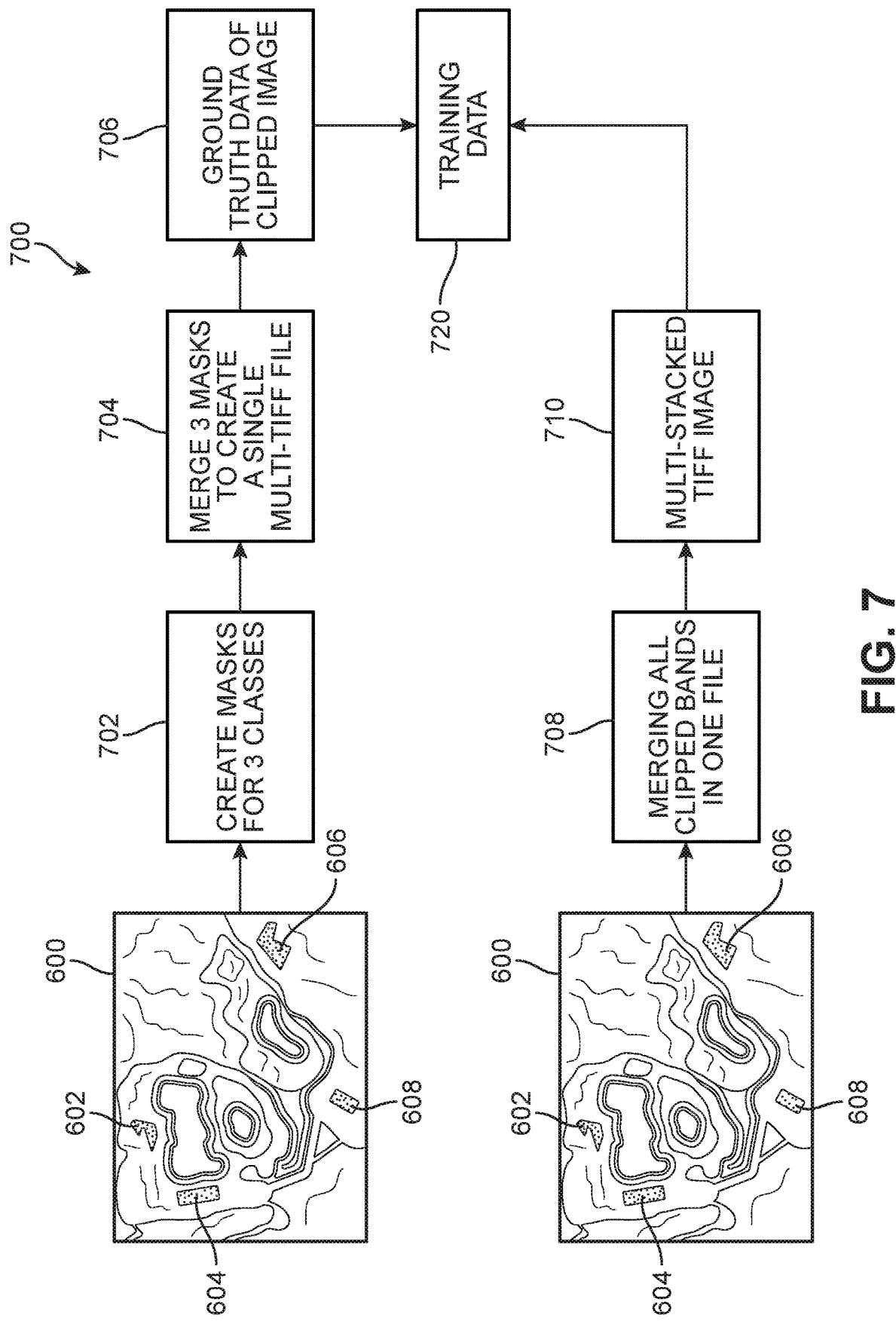
FIG. 7 is a representative view of an example embodiment of a process of merging training data for a coal stock pile analysis system.

In some embodiments, localization module 102 of coal stock pile analysis system 100 may use an AI or machine-learning based algorithm to identify the boundaries of the coal stock piles as part of the localization process shown in FIG. 6. In an example embodiment, localization module 102 may be trained using training data for a site (e.g., site 600) to assist with detecting and identifying the boundaries of each of the coal stock piles at a given site. Referring now to FIG. 7, an example embodiment of a process 700 of merging training data for coal stock pile analysis system 100 is shown. In an example embodiment, process 700 may be used to train localization module 102 of coal stock pile analysis system 100 to identify boundaries of the coal stock pile, as described above.

In this embodiment, process 700 is performed using data associated with site 600 that has a plurality of coal stock piles, including first coal stock pile 602, second coal stock pile 604, third coal stock pile 606, and fourth coal stock pile 608. In a step 702 of process 700, masks are created or generated for three classes of objects or areas included in the images associated with site 600. For example, at step 702 the three classes may include a first class associated with the site itself (e.g., site 600) apart from any surrounding areas or facilities, a second class associated with the one or more coal stock piles (e.g., coal stock piles 602, 604, 606, 608), and a third class associated with other features of site 600 that are of interest to be identified in the aerial data, such as bodies of water, or other features.

Next, process 700 includes a step 704 where the masks for all three classes (i.e., first class, second class, and third class) are merged to create a single image file, for example, a single multi-tagged image file format (TIFF) file. At a step 706 of process 700 the ground truth data for the clipped image (i.e., the image file from step 704) is determined to obtain the parameters associated with the areas to be analyzed (e.g., the three identified classes). These parameters are then provided as part of training data 720.

Additionally, process 700 further includes a step 708 of merging all of the clipped bands of multi-spectral data associated with site 600 into a single file. For example, as described above, multi-spectral data for a site include data associated with different wavelengths of the obtained images of the site. In addition, in some embodiments, hyper-spectral data may be obtained for the images of the site. In this embodiment, step 708 includes merging all available bands or channels of multi-spectrum data (or hyper-spectral data) from images of site 600. At a step 710, a multi-stacked image file is generated from the multi-spectrum data, for example, a multi-TIFF clipped image file. This multi-stacked image file including the multi-spectrum data for site 600 is also provided as part of training data 720.

In an example embodiment, training data 720 obtained through process 700 may then be provided to localization module 102 of coal stock pile analysis system 100 for localization training purposes. Localization training of localization module 102 may be implemented with a machine-learning algorithm, for example, a U-Net convolutional neural network or other deep learning model, that uses training data 720 to train localization module 102 to detect and/or identify the boundaries of each class of area at a site (e.g., areas of site 600), including identifying the boundaries of one or more coal stock piles at the site (e.g., first boundary 610 of first coal stock pile 602, second boundary 612 of second coal stock pile 604, third boundary 614 of third coal stock pile 606, and fourth boundary 616 of fourth coal stock pile 608).

Figure 8:
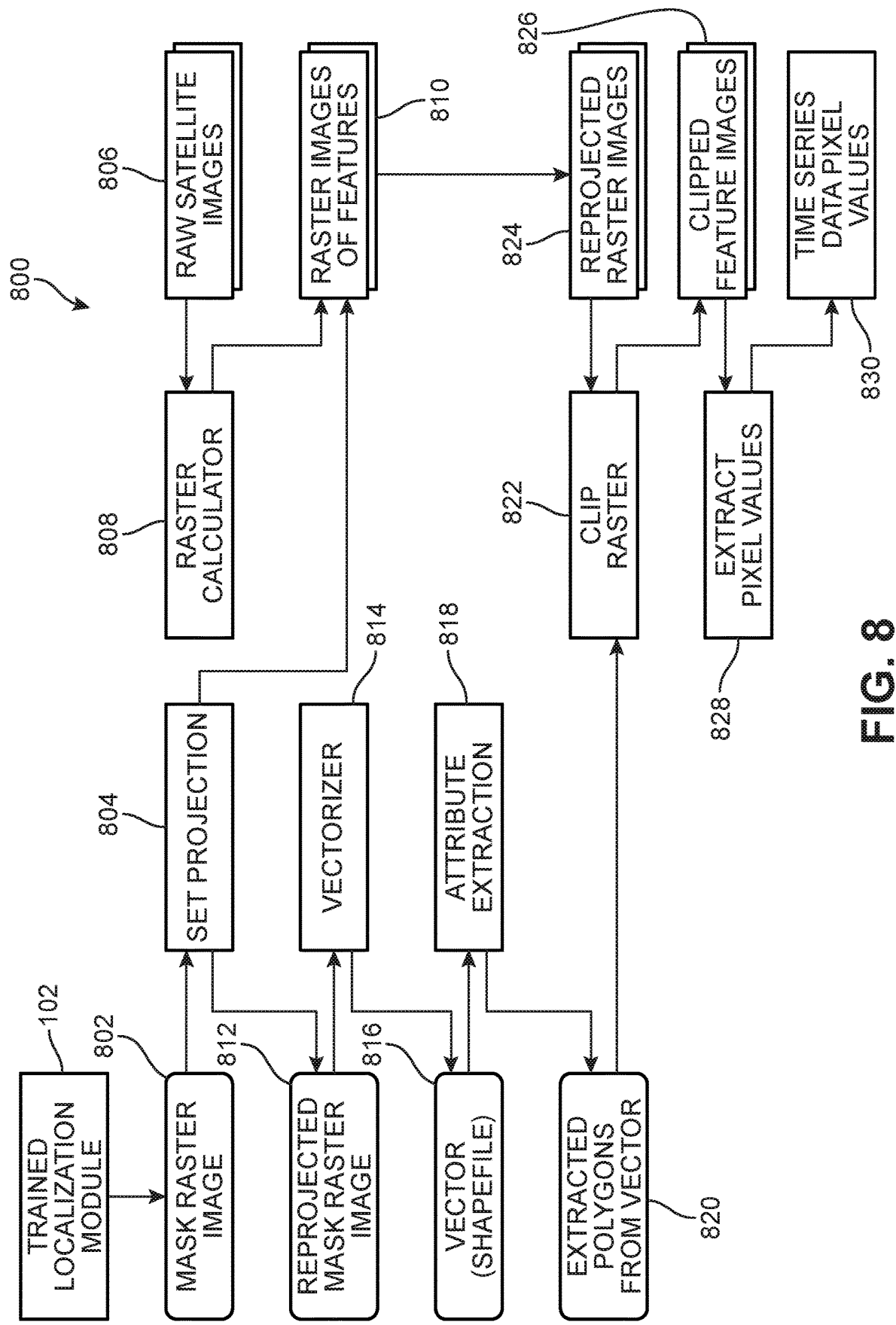
FIG. 8 is a representative view of an example embodiment of a process for obtaining data associated with coal stock piles.

FIG. 8 is a representative view of an example embodiment of a process 800 for obtaining data associated with coal stock piles at a site. In some embodiments, process 800 may be implemented by localization module 102 of coal stock pile analysis system 100 to extract multi-spectral features and other data associated with the identified coal stock piles (e.g., coal stock piles 602, 604, 606, 608 at site 600, described above). For example, in an example embodiment, process 800 may be performed as part of operation 206 of method 200, described above.

In this embodiment, process 800 includes a step 802 where a raster image is masked, for example, a satellite image obtained for site 600, and a set projection is applied to the masked image at a step 804. Next, at a step 806, raw satellite images are obtained and provided to a raster calculator at a step 808. Process 800 includes a step 810 where raster images of features associated with the site and/or the coal stock piles (e.g., coal stock piles 602, 604, 606, 608 at site 600) are obtained from the raster calculator step 808 and the set projection step 804. At a step 812, reprojected mask raster images are passed through a vectorizer at a step 814 to convert the raster images to vector images. The resulting vector, for example in a shapefile format or other suitable format, is provided at a step 816.

At a step 818, one or more attributes are extracted from the vector and provided at a step 820 in the form of a plurality of extracted polygons from the vector. At a step 822, portions of reprojected raster images from a step 824 are clipped, for example, corresponding to features of interest at the site (e.g., site 600), such as the coal stock pile locations, bodies of water, and other areas. At a step 826, clipped feature images are obtained and, at a step 828, pixel values of the clipped feature images are extracted. Finally, at a step 830, time series data of the pixel values are provided. With this arrangement, process 800 may be used by localization module 102 of coal stock pile analysis system 100 to extract multi-spectral features and other data associated with the identified coal stock piles (e.g., coal stock piles 602, 604, 606, 608 at site 600, described above) as part of operation 206 of method 200.

Figure 9:
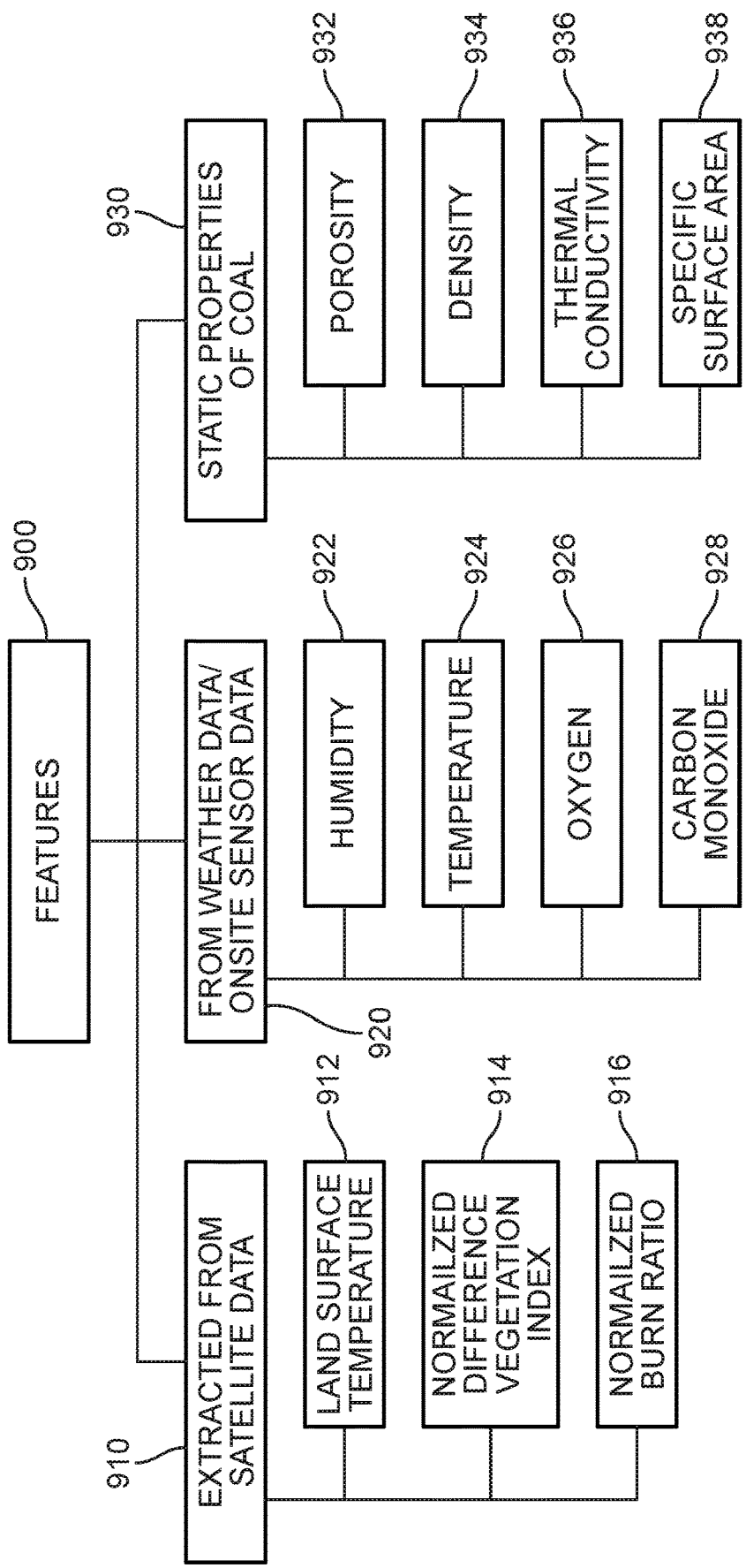
FIG. 9 is a schematic view of an example embodiment of features associated with a coal stock pile used by a coal stock pile analysis system for predictions.

Referring now to FIG. 9, an example embodiment of a variety of different features 900 associated with a coal stock pile that may be used by coal stock pile analysis system 100 for making predictions are shown. In some embodiments, one or more of features 900 may be extracted by localization module 102, for example, as part of process 800, described above. In addition, in some embodiments, features 900 may also be obtained from various data sources, including aerial data 110, on-site data 112, and/or other data 114, such as weather data, historical data, properties of coal, etc.

In this embodiment, features 900 include at least a first set of features 910 obtained or extracted from satellite data. Satellite data used for first set of features 910 may include aerial data 110, as well as satellite images from GIS server 108 and/or satellite data associated with historical data. In this embodiment, first set of features 910 from the satellite data include a land surface temperature 912, a normalized difference vegetation index (NDVI) 914, and/or a normalized burn ratio (NBR) 916. It should be understood that first set of features 910 may also include additional features obtained from the satellite data that are used by coal stock pile analysis system 100 for making predictions.

Features 900 may also include a second set of features 920 obtained or extracted from weather data and/or on-site sensor data (e.g., on-site data 112 from one or more local sensors at a site). In this embodiment, second set of features 920 from the weather data and/or on-site sensor data include humidity 922, temperature 924, oxygen levels 926, and carbon monoxide levels 928. It should be understood that second set of features 920 may also include additional features obtained from the weather data and/or on-site sensor data that are used by coal stock pile analysis system 100 for making predictions.

In some embodiments, features 900 may also include a third set of features 930 that are obtained based on static properties or characteristics of coal. For example, in this embodiment, third set of features 930 includes porosity 932, density 934, thermal conductivity 936, and specific surface area 938. As described above, in some embodiments, the static properties or characteristics of coal may be obtained by testing or mathematical calculations. It should be understood that third set of features 930 may also include additional features obtained based on properties or characteristics of coal that are used by coal stock pile analysis system 100 for making predictions.

Figure 10:
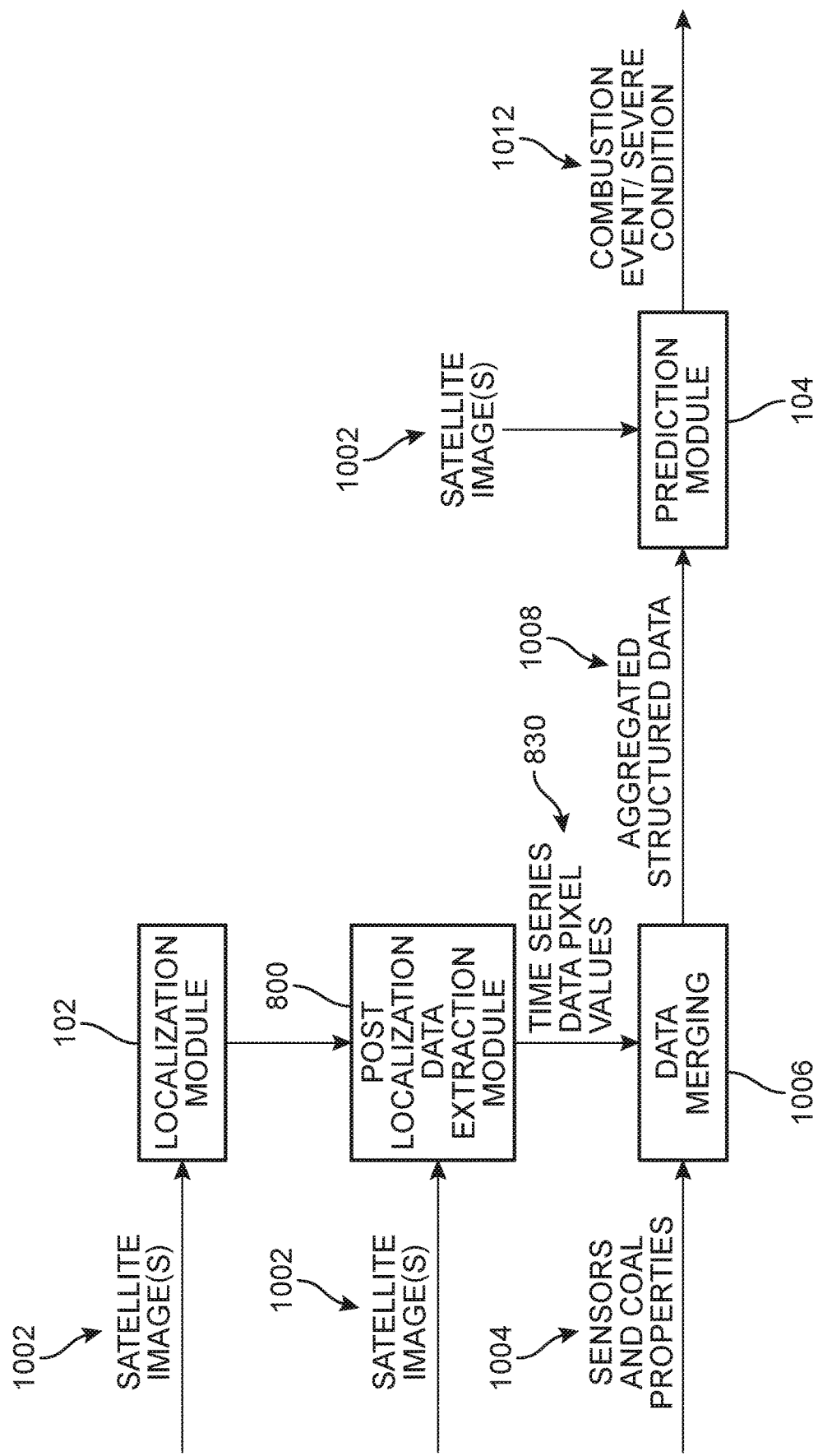
FIG. 10 is a schematic view of an example embodiment of a process for using obtained data to generate a prediction about a coal stock pile condition.

FIG. 10 illustrates an example embodiment of a process 1000 for using obtained data associated with a site including one or more coal stock piles to generate a prediction about a coal stock pile condition. In some embodiments, process 1000 may be implemented by coal stock pile analysis system 100 to predict at least one of an impending combustion event or a severe condition associated with the one or more coal stock piles at a site (e.g., site 600, described above).

In this embodiment, process 1000 includes receiving or obtaining satellite images 1002 by localization module 102, which may perform localization of the images, as described above with reference to operation 204 of method 200 and also FIG. 6. Once satellite images 1002 are localized using localization module 102 according to process 800 to extract the data, the resulting time series data pixel values 830 are provided to a data merging operation 1006. Process 1000 also includes receiving or obtaining satellite images 1002 and additional data 1004, such as from on-site sensors and/or properties of coal, which are also merged at data merging operation 1006. For example, data merging operation 1006 may be performed as described in operation 210 of method 200, above.

Next, aggregated structured data 1008 from data merging operation 1006 and an image based decision 1010 from localization module 102 are provided to prediction module 104. Prediction module 104 receives aggregated structured data 1008 and image based decision 1010 and applies machine-learning to the data using the trained prediction model to make a prediction 1012 of an impending combustion event or a severe condition associated with one or more coal stock piles at the site.

Figure 11:
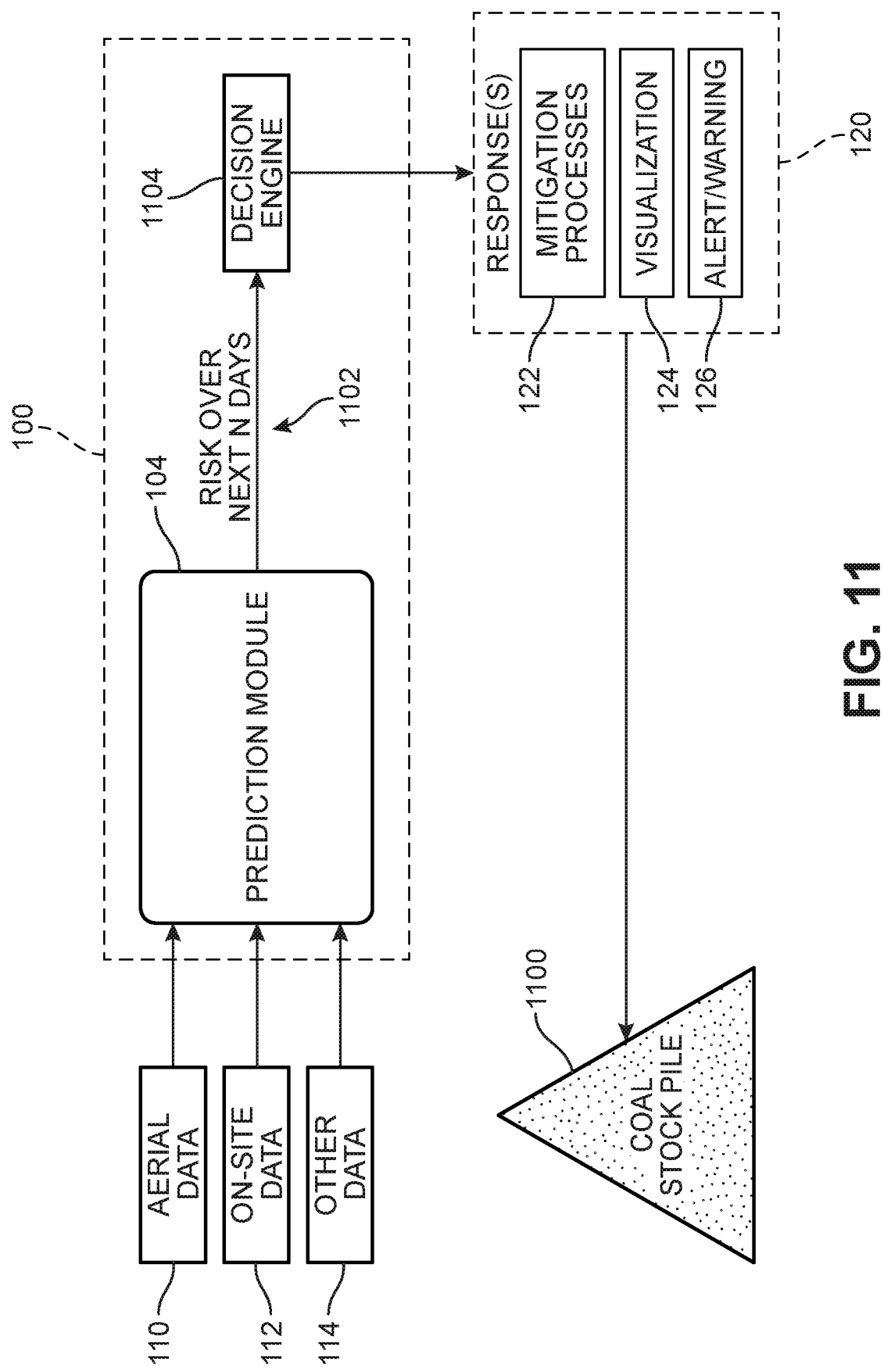
FIG. 11 is a schematic view of an example embodiment of a coal stock pile analysis system initiating a response based on a prediction about a coal stock pile condition.

Referring now to FIG. 11, an example embodiment of coal stock pile analysis system 100 initiating a response based on a prediction about a coal stock pile condition is shown. In this embodiment, coal stock pile analysis system 100 receives or collects a plurality of data associated with a coal stock pile 1100 associated with a site. As described above, the plurality of data includes aerial data 110, on-site data 112, and/or other data 114, which is used by prediction module 104 of coal stock pile analysis system 100 to make a determination 1102 about the potential risk of a combustion event or severe condition associated with coal stock pile 1100 over some predetermined time period, for example, over the next N days (where N can be any predetermined number of days). Based on the risk determination 1102, a decision engine 1104 associated with prediction module 104 may predict an impending combustion event or a severe condition associated with coal stock pile 1100. For example, decision engine 1104 may reach a decision (i.e., a prediction) using process 1000, described above.

The resulting prediction from decision engine 1104 of coal stock pile analysis system 100 may be used to initiate one or more responses 120. As described above, responses 120 may include mitigation processes 122 to reduce the likelihood of the predicted impending combustion event or to reduce or control severe conditions associated with the coal stock pile, such as rising temperatures or harmful gasses. In some embodiments, mitigation processes 122 may include initiating a sprinkler system to douse the coal stock piles, initiating automatic dozing of the coal stock piles to compact and/or dress the stock pile, or other automatic or manual actions intended to mitigate the risk of the predicted impending combustion event or severe condition associated with coal stock pile 1100.

Other types of responses 120 may include visualization 124 of coal stock pile 1100 at the site, for example, provided on a monitor or display associated with coal stock pile analysis system 100 and/or at the site, as well as alert or warning 126 that may be provided to workers at the site or near coal stock pile 1100 about the predicted impending combustion event or severe condition so that they may keep a safe distance away from potentially dangerous areas.

Figure 12:
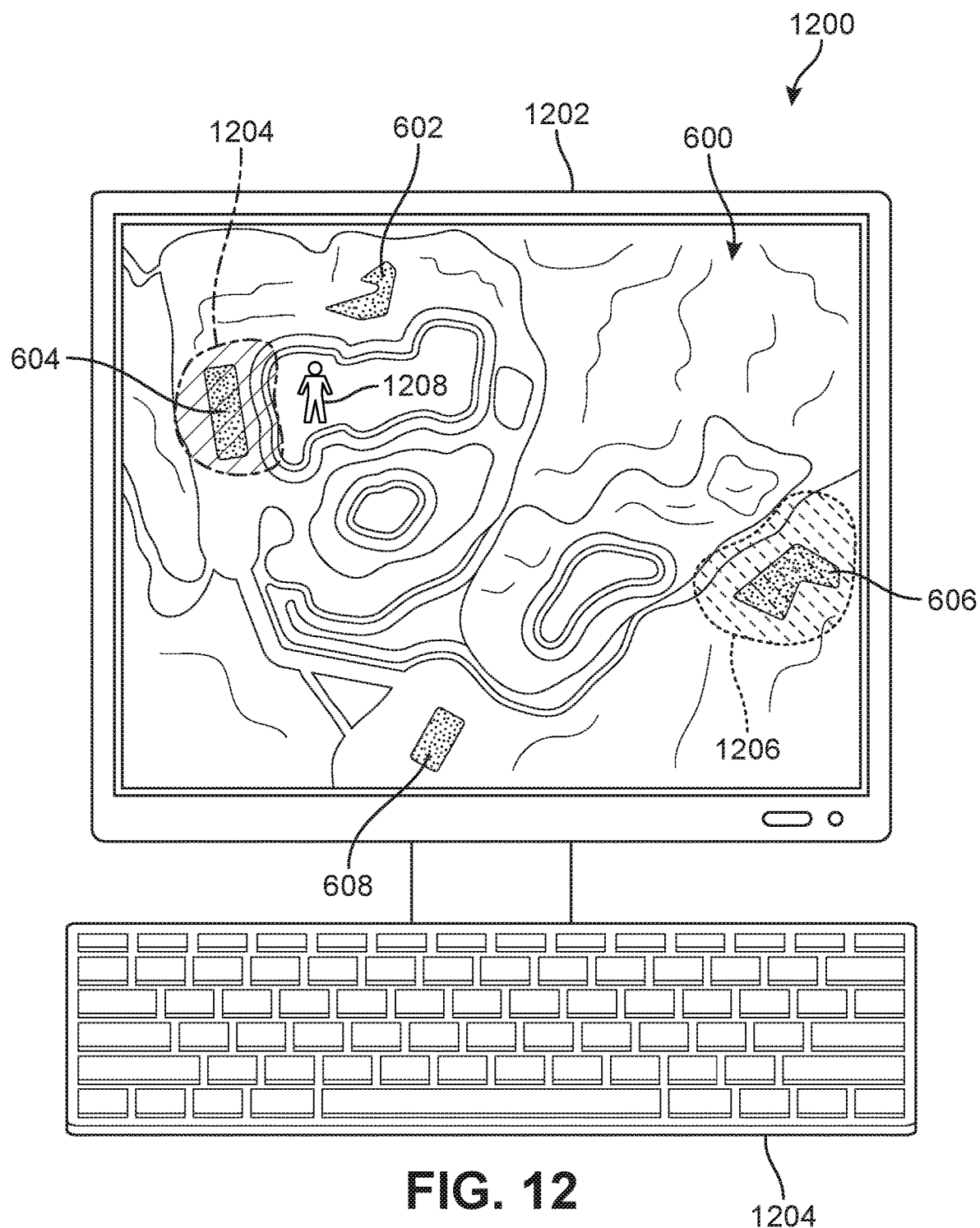
FIG. 12 is a representative view of an example embodiment of a visualization of conditions associated with a coal stock pile.

FIG. 12 is a representative view of an example embodiment of a visualization 1200 of conditions associated with coal stock piles at a site. In one embodiment, visualization 1200 is provided for site 600 that includes a plurality of coal stock piles, including first coal stock pile 602, second coal stock pile 604, third coal stock pile 606, and fourth coal stock pile 608, as described above. In this embodiment, visualization 1200 is provided on a display or monitor 1202 of a computer (not shown) and may include a keyboard 1204 or other input device.

As shown in FIG. 12, visualization 1200 depicts site 600 with coal stock piles 602, 604, 606, 608. In this embodiment, coal stock pile analysis system 100 has made a prediction of an impending combustion event or severe condition associated with at least two of the coal stock piles at site 600. For example, second coal stock pile 604 is associated with a predicted combustion event or severe condition and, as a result, visualization 1200 includes a first geo-fence 1204 surrounding second coal stock pile 604. Additionally, in this embodiment, third coal stock pile 606 is also associated with a predicted combustion event or severe condition and, as a result, visualization 1200 includes a second geo-fence 1206 surrounding third coal stock pile 606.

First geo-fence 1204 provides a safety zone or area extending beyond the boundaries of second coal stock pile 604 to restrict access by people, such as worker 1208, or machines at site 600 due to the predicted combustion event or severe condition associated with second coal stock pile 604. For example, worker 1208 may have a global positioning system (GPS) locator (e.g., a wearable device) to track and/or warn worker 1208 as they approach first geo-fence 1204 surrounding second coal stock pile 604. Second geo-fence 1206 may similarly provide a safety zone or area extending beyond the boundaries of third coal stock pile 606 to restrict access due to the predicted combustion event or severe condition associated with third coal stock pile 606.

Additionally, in some embodiments, visualization 1200 may include indicia or other mechanisms to distinguish between different levels or severity of a predicted combustion event or severe condition associated with the coal stock piles. For example, first-geo fence 1204 of second coal stock pile 604 may be depicted on display 1202 with a first color (e.g., red) that indicates a high risk that the stock pile is currently undergoing a combustion event or severe condition, or the stock pile is predicted or forecasted to undergo a combustion event or severe condition in the near future (i.e., within a predetermined time period). Whereas, second geo-fence 1026 of third coal stock pile 606 may be depicted on display 1202 with a second color (e.g., yellow) that is different from the first color to indicate a moderate risk of an impending combustion event or severe condition for that coal stock pile.

In addition, in some embodiments, visualization 1200 may include other coal stock piles at the site (e.g., first coal stock pile 602 and/or fourth coal stock pile 606 at site 600) that are depicted on display 1202 with a third color (e.g., green) that is different from the first color and second color to indicate that the coal stock piles are within acceptable limits. For example, as shown in FIG. 12, either or both of first coal stock pile 602 and/or fourth coal stock pile 606 at site 600 may be depicted in the third color so indicate that coal stock pile analysis system 100 has not predicted a likelihood of an impending combustion event or severe condition associated with these stock piles.

Figure 13:
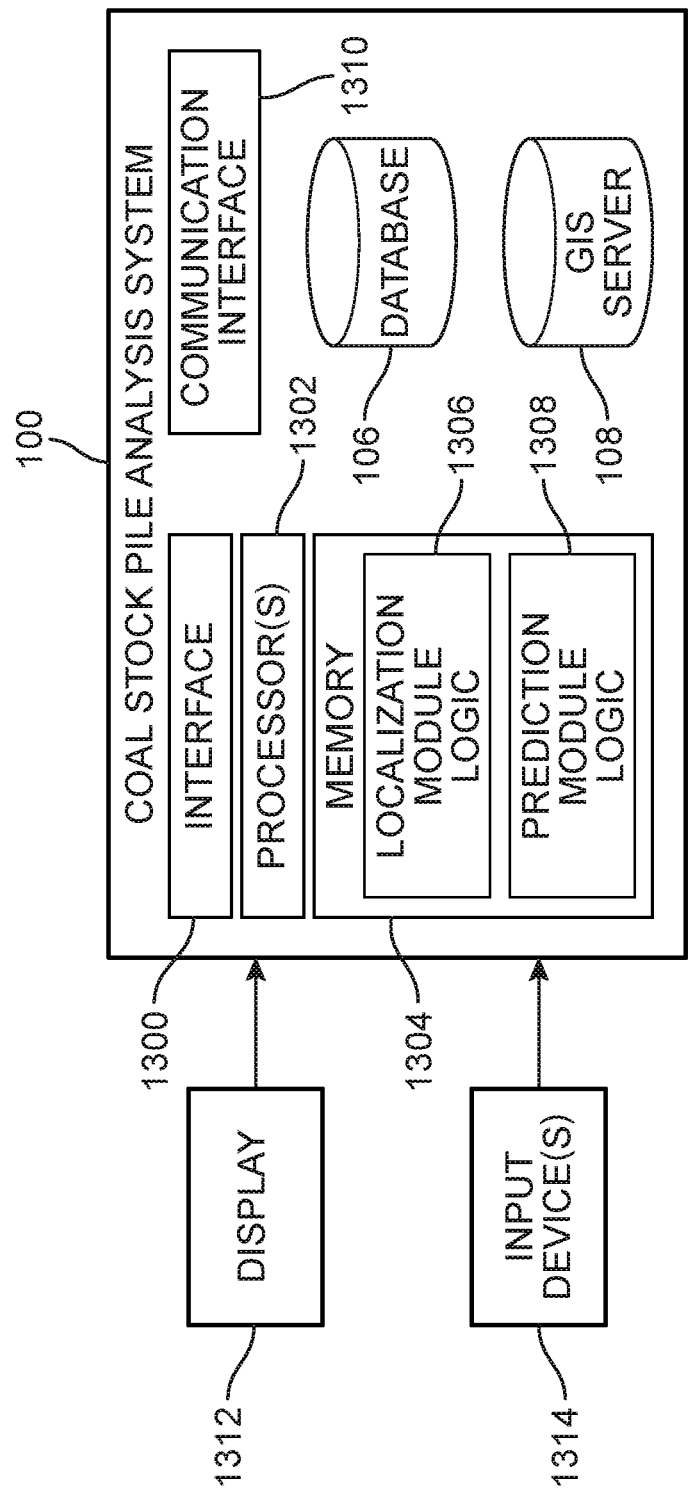
FIG. 13 is a block diagram of an example embodiment of a coal stock pile analysis system.

Referring now to FIG. 13, a block diagram of an example embodiment of coal stock pile analysis system 100 is shown. The various techniques according to the embodiments described herein may be implemented in hardware, software, or a combination thereof. In an example embodiment, coal stock pile analysis system 100 is configured to perform the operations described above and depicted in connection with FIGS. 1-12 above. In this embodiment, coal stock pile analysis system 100 includes an interface 1300, one or more processors 1302, a memory 1304, database 106, GIS server 108, and a communication interface 1310.

Interface 1300 may be any type of interface that allows coal stock pile analysis system 100 to communicate with users and/or other computers or systems. For example, in some embodiments, coal stock pile analysis system 100 may be implemented as a service. In such an embodiment, interface 1300 may allow coal stock pile analysis system 100 to communicate with one or more users or operators associated with different sites that include coal stock piles. In other embodiments, coal stock pile analysis system 100 may be implemented on a computer or other device and interface 1300 may be configured to permit a user to interact with coal stock pile analysis system 100. In one embodiment, coal stock pile analysis system 100 may optionally include a display 1312, such as a monitor or other output, and one or more input devices 1314, such as a keyboard, mouse, stylus, touch screen, etc., to allow a user to interact with coal stock pile analysis system 100.

Processor 1302 may be a microprocessor or microcontroller configured to implement operations associated with operations of coal stock pile analysis system 100. Processor 1302 executes instructions associated with software stored in memory 1304. Specifically, memory 1304 stores instructions for various control logic that, when executed by the processor 1302, causes processor 1302 to perform various operations on behalf of coal stock pile analysis system 100 as described herein. In this embodiment, memory 1304 includes at least localization module logic 1306 and prediction module logic 1308. Localization module logic 1306 is configured to implement operations associated with localization of one or more coal stock piles at a site, for example, as described above in reference to localization module 102 and/or operations 204, 206 of method 200, as well as other operations associated with FIGS. 6, 8, and 10.

Prediction module logic 1308 is configured to implement operations associated with predicting at least one of an impending combustion event or a severe condition associated with one or more coal stock piles at a site, for example, as described above in reference to prediction module 104 and/or operations of method 200, as well as operations associated with FIGS. 1-5, 7, 9, 11, and 12.

Memory 1304 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, memory 1304 may comprise one or more tangible (non-transitory) computer readable storage media (e.g., a memory device) encoded with software comprising computer executable instructions and when the software is executed (by the processor 1302) it is operable to perform operations described herein.

Communication interface 1310 facilitates communications between coal stock pile analysis system 100 and other computers and devices, including to receive or obtain data (e.g., aerial data 110, on-site data 112, other data 114, GIS server 108, etc.) and to implement response (e.g., responses 120). For example, communication interface 1310 may allow coal stock pile analysis system 100 to communicate with one or more local or on-site sensors at the site, wearable devices associated with workers at the site, machines or system associated with implementing automated responses (e.g., responses 120) to a predicted combustion event or severe condition, as well as other devices, computers, systems, etc.

Additionally, while the previous embodiments have been described in reference to monitoring and prediction of combustion events and/or severe conditions associated with coal stock piles, the techniques described herein may be similarly applied to other stored materials that undergo combustion and/or severe conditions when stored in stock piles.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method for predicting conditions associated with a coal stock pile, the method comprising:
 collecting aerial data for a site including one or more coal stock piles;
 using the aerial data, performing localization of the site to identify boundaries of the one or more coal stock piles;
 extracting multi-spectral features for the one or more coal stock piles;

obtaining additional data associated with the one or more coal stock piles from at least one data source;
merging the collected aerial data with the obtained additional data for the one or more coal stock piles;
using the merged data and the extracted multi-spectral features, analyzing a status of the one or more coal stock piles, by a prediction module implementing a machine-learning algorithm, to predict at least one of an impending combustion event or a severe condition associated with the one or more coal stock piles;
training the prediction module using historical data associated with previous combustion events associated with one or more sites including a coal stock pile, wherein the historical data includes at least satellite data or weather data for at least one site associated with a previous combustion event;
obtaining the satellite data or weather data for the at least one site associated with the previous combustion event for a time window that includes a time period prior to the previous combustion event and a time period after the previous combustion event; and
in response to the predicted at least one impending combustion event or severe condition, implementing a response.

2. The method according to claim 1, further comprising:
training the prediction module using the merged data to predict conditions associated with the one or more coal stock piles.

3. The method according to claim 1, wherein the multi-spectral features include data obtained within a plurality of specific wavelength ranges.

4. The method according to claim 3, wherein the multi-spectral features include between three and fifteen bands of data each associated with different wavelength ranges.

5. The method according to claim 1, further comprising:
analyzing news reports using a natural language processing module to recognize information associated with the previous combustion event.

6. The method according to claim 1, wherein the response includes at least one of a mitigation process, geo-fencing, a visualization, or an alert.

7. The method according to claim 6, wherein the mitigation process includes at least one of:
initiating a sprinkler system to douse the one or more coal stock piles associated with the predicted at least one impending combustion event or severe condition; or
initiating automatic dozing of the one or more coal stock piles associated with the predicted at least one impending combustion event or severe condition.

8. The method according to claim 1, wherein obtaining the additional data associated with the one or more coal stock piles from the at least one data source includes:
obtaining data from at least one of an onsite sensor at the site of the one or more coal stock piles; and/or
calculating properties of coal associated with the one or more coal stock piles.

9. One or more non-transitory computer readable storage media encoded with instructions that, when executed by a processor of a coal stock pile analysis system, causes the processor to:
collect aerial data for a site including one or more coal stock piles;
using the aerial data, perform localization of the site to identify boundaries of the one or more coal stock piles;
extract multi-spectral features for the one or more coal stock piles;
obtain additional data associated with the one or more coal stock piles from at least one data source;
merge the collected aerial data with the obtained additional data for the one or more coal stock piles;
using the merged data and the extracted multi-spectral features, analyze a status of the one or more coal stock piles, by a prediction module implementing a machine-learning algorithm, to predict at least one of an impending combustion event or a severe condition associated with the one or more coal stock piles;
train the prediction module using historical data associated with previous combustion events associated with one or more sites including a coal stock pile, wherein the historical data includes at least satellite data or weather data for at least one site associated with a previous combustion event;
obtain the satellite data or weather data for the at least one site associated with the previous combustion event for a time window that includes a time period prior to the previous combustion event and a time period after the previous combustion event; and
in response to the predicted at least one impending combustion event or severe condition, implement a response.

10. The one or more non-transitory computer readable store media according to claim 9, wherein the instructions further cause the processor to:
train the prediction module using the merged data to predict conditions associated with the one or more coal stock piles.

11. The one or more non-transitory computer readable store media according to claim 9, wherein the multi-spectral features include data obtained within a plurality of specific wavelength ranges.

12. The one or more non-transitory computer readable store media according to claim 11, wherein the multi-spectral features include between three and fifteen bands of data each associated with different wavelength ranges.

13. The one or more non-transitory computer readable store media according to claim 9, wherein the response includes at least one of a mitigation process, geo-fencing, a visualization, or an alert.

14. The one or more non-transitory computer readable store media according to claim 13, wherein the mitigation process includes at least one of:
initiating a sprinkler system to douse the one or more coal stock piles associated with the predicted at least one impending combustion event or severe condition; or
initiating automatic dozing of the one or more coal stock piles associated with the predicted at least one impending combustion event or severe condition.

15. The one or more non-transitory computer readable store media according to claim 9, wherein obtaining the additional data associated with the one or more coal stock piles from the at least one data source includes:
obtaining data from at least one of an onsite sensor at the site of the one or more coal stock piles; and/or
calculating properties of coal associated with the one or more coal stock piles.

16. A coal stock pile analysis system for predicting conditions associated with a coal stock pile, the coal stock pile analysis system comprising:
at least one communication interface;
a memory; and
a processor in communication with the at least one communication interface and the memory, wherein the processor is configured to:

collect aerial data for a site including one or more coal stock piles;
using the aerial data, perform localization of the site to identify boundaries of the one or more coal stock piles;
extract multi-spectral features for the one or more coal stock piles;
obtain additional data associated with the one or more coal stock piles from at least one data source;
merge the collected aerial data with the obtained additional data for the one or more coal stock piles;
using the merged data and the extracted multi-spectral features, analyze a status of the one or more coal stock piles, by a prediction module implementing a machine-learning algorithm, to predict at least one of an impending combustion event or a severe condition associated with the one or more coal stock piles;
train the prediction module using historical data associated with previous combustion events associated with one or more sites including a coal stock pile, wherein the historical data includes at least satellite data or weather data for at least one site associated with a previous combustion event;
obtain the satellite data or weather data for the at least one site associated with the previous combustion event for a time window that includes a time period prior to the previous combustion event and a time period after the previous combustion event; and
in response to the predicted at least one impending combustion event or severe condition, implement a response.

17. The coal stock pile analysis system according to claim 16, wherein the processor is further configured to:
train the prediction module using the merged data to predict conditions associated with the one or more coal stock piles.

18. The coal stock pile analysis system according to claim 16, wherein the multi-spectral features include data obtained within a plurality of specific wavelength ranges.

19. The coal stock pile analysis system according to claim 16, wherein the response includes a mitigation process; and wherein the mitigation process includes at least one of:
initiating a sprinkler system to douse the one or more coal stock piles associated with the predicted at least one impending combustion event or severe condition; or
initiating automatic dozing of the one or more coal stock piles associated with the predicted at least one impending combustion event or severe condition.

20. The coal stock pile analysis system according to claim 16, wherein obtaining the additional data associated with the one or more coal stock piles from the at least one data source includes:
obtaining data from at least one of an onsite sensor at the site of the one or more coal stock piles; and/or
calculating properties of coal associated with the one or more coal stock piles.

* * * * *